(12) United States Patent
Ball

(10) Patent No.: US 6,679,473 B1
(45) Date of Patent: Jan. 20, 2004

(54) PUSH AND TURN HYDRANT FOR DELIVERY OF HOT OR COLD WATER THROUGH A SINGLE DISCHARGE CONDUIT

(75) Inventor: William T. Ball, Colorado Springs, CO (US)

(73) Assignee: WCM Industries, Inc., Colorado Springs, CO (US)

( * ) Notice: Subject to any disclaimer, the term of this patent is extended or adjusted under 35 U.S.C. 154(b) by 123 days.

(21) Appl. No.: 09/812,964

(22) Filed: Mar. 20, 2001

(51) Int. Cl.[7] .............................................. F16K 35/02
(52) U.S. Cl. ...................................................... 251/96
(58) Field of Search ................................... 251/96, 77

(56) References Cited

U.S. PATENT DOCUMENTS

| | | | |
|---|---|---|---|
| 2,218,662 A | * 10/1940 | Smith | 137/625.5 X |
| 2,829,538 A | * 4/1958 | Mueller | 251/96 X |
| 3,193,243 A | * 7/1965 | Billington et al. | 251/96 |
| 3,210,040 A | * 10/1965 | Thurlow | 251/96 |
| 5,217,201 A | 6/1993 | Self | |
| 5,346,065 A | 9/1994 | Dunbar et al. | |
| 5,364,065 A | * 11/1994 | Tauati | 251/96 |
| 5,449,144 A | 9/1995 | Kowalics | |
| 5,513,831 A | 5/1996 | Seward | |
| 5,551,124 A | 9/1996 | Zeringue | |
| 5,590,679 A | 1/1997 | Almasy et al. | |
| 5,632,303 A | 5/1997 | Almasy et al. | |
| 5,671,904 A | 9/1997 | Minutillo | |
| 6,019,345 A | 2/2000 | Bullard | |
| 6,142,172 A | 11/2000 | Shuler et al. | |

* cited by examiner

*Primary Examiner*—Gene Mancene
*Assistant Examiner*—Eric Keasel

(57) ABSTRACT

A hydrant for delivery of hot or cold water has first and second parallel splined fluid inlet pipes. The pipes have forward and rearward ends and are connected to sources pressurized water. A laterally extending fluid conduit member connects the forward ends of the first and second fluid inlet pipes. A fluid closure valve is located in the rearward ends of each of the first and second fluid pipes. A valve rod having forward and rearward ends rotatably extends through pipes and has one end operatively connected to closure valves. A longitudinally spring loaded handle is slideably engageable with the forward end of the valve rods to permit the manual movement of the rods to open or close the fluid closure valves. When the handle is pushed inwardly to engage splines in the rod and handle.

5 Claims, 7 Drawing Sheets

PUSH AND TURN HYDRANT FOR DELIVERY OF HOT OR COLD WATER THROUGH A SINGLE DISCHARGE CONDUIT

BACKGROUND OF THE INVENTION

This invention is directed to a hydrant for delivery of hot or cold water through a single discharge and more particularly one with a push and turn operation.

It is often desirable to have both hot and cold water available at a hydrant. While the temperature of the water discharge can vary, sometimes when only hot water is discharged the temperature can be of a degree that poses a potential risk for the user. Likewise, there may be situations when one desires to prohibit access to hot water through a hydrant having the delivery of hot or cold water which is not presently available.

It is therefore a principal object of this invention to provide a hydrant for delivery of hot or cold water through a single discharge conduit having a push and turn operation.

It is a further object of this invention to enhance the safe use of the hydrant.

It is still further an object of this invention to provide a hydrant for delivery of hot or cold water where access to hot water can be restricted.

SUMMARY OF THE INVENTION

A hydrant for delivery of hot or cold water from a single discharge conduit has first and second fluid inlet pipes in parallel spaced relation. The pipes have forward and rearward ends and are connected respectively to sources of hot and cold pressurized water.

A laterally extending fluid conduit member connects the forward ends of the first and second fluid inlet pipes and is in communication therewith.

A fluid closure valve is located in the rearward ends of each of the first and second fluid pipes.

A valve rod having forward and rearward ends rotatably extends through the laterally extending fluid conduit and through the forward ends of the first and second inlet pipes and has one end operatively connected to the closure valves in the rearward ends of the fluid inlet pipes. The forward end of the rod has a plurality of male splines. A spring-loaded handle is located on a protruding forward end of the valve rods to permit the manual movement of the rods to open or close the fluid closure valves. The handle has a plurality of female splines or grooves that slideably engage the male splines of the rod when the handle is compressed toward the rod. The spring of the spring-loaded handle normally keeps the male and female splines out of engagement. When the spring-loaded handle is manually pushed inwardly to compress the spring, the splines engage and will permit the rod to be rotated to open the valve.

A fluid outlet port has a rearward end in communication with the laterally extending fluid conduit and extends forwardly and downwardly and terminates in a hose threaded portion. A check valve is located in the fluid exit conduit to prevent fluid flow therein only towards the forward end of the fluid exit conduit.

DESCRIPTION OF THE PREFERRED EMBODIMENT

Figure 1:
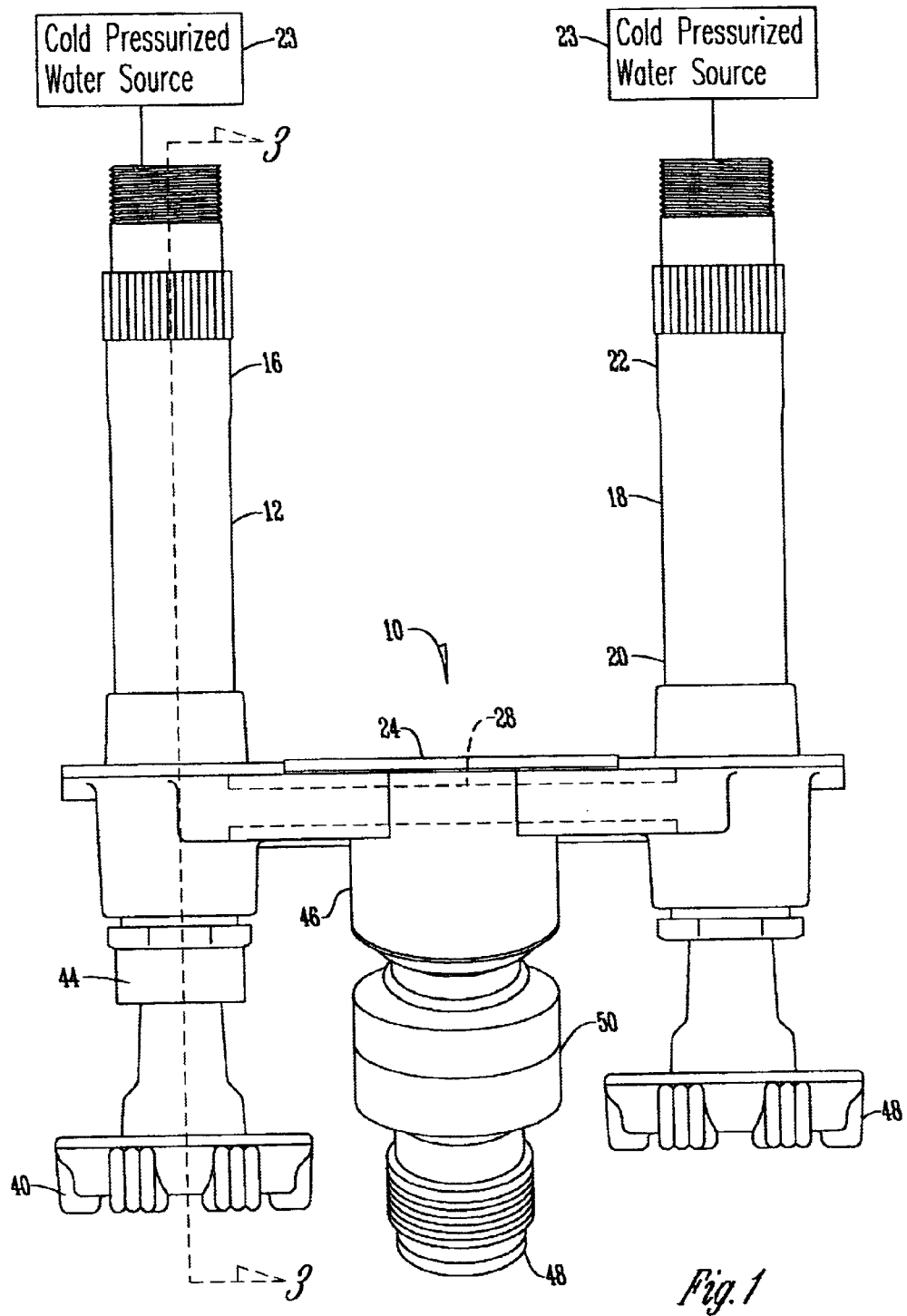
FIG. 1 is a plan view of the hydrant of this invention.
Figure 2:
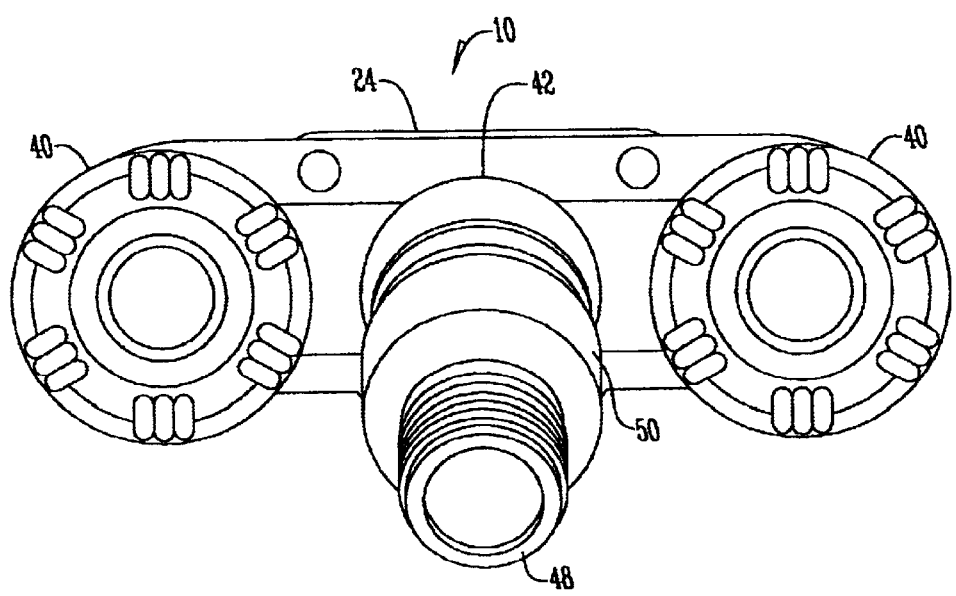
FIG. 2 is a front elevational view as seen from the bottom end of FIG. 1.
Figure 3:
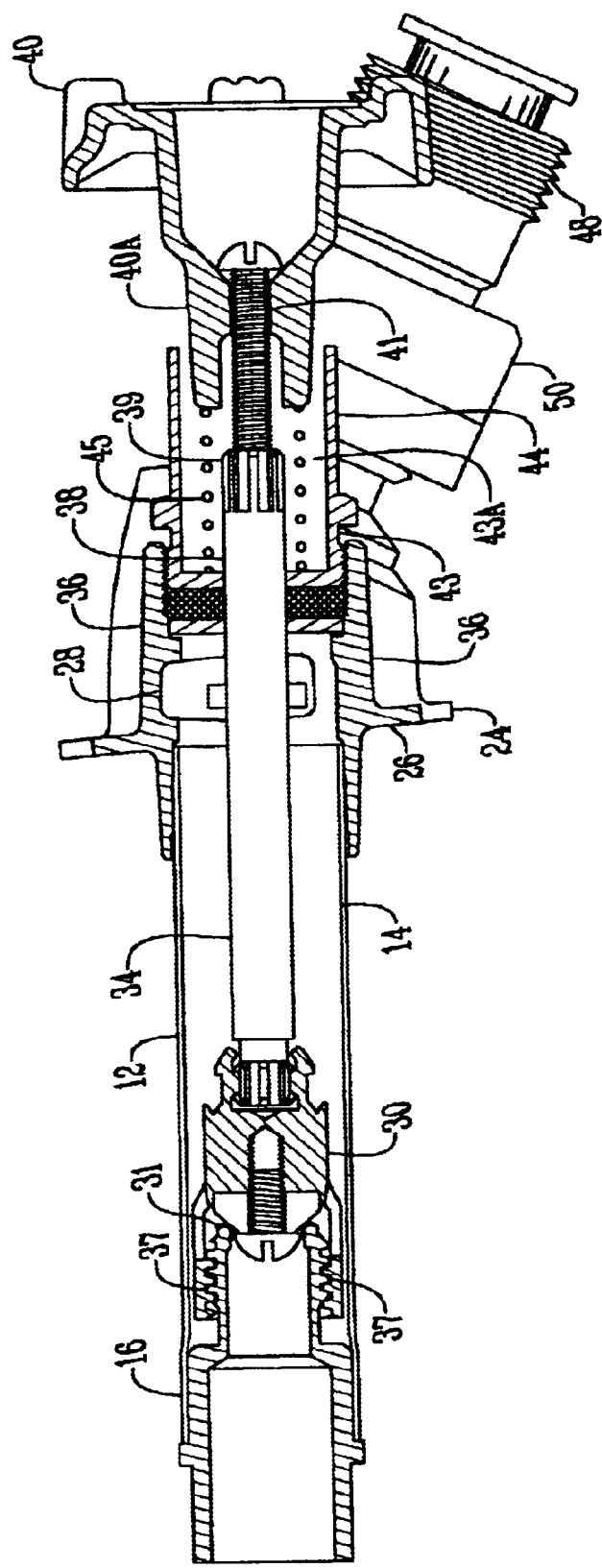
FIG. 3 is a sectional view taken on line 3—3 of FIG. 1 where valve is in closed position and the handle is disengaged from the rod.
Figure 4:
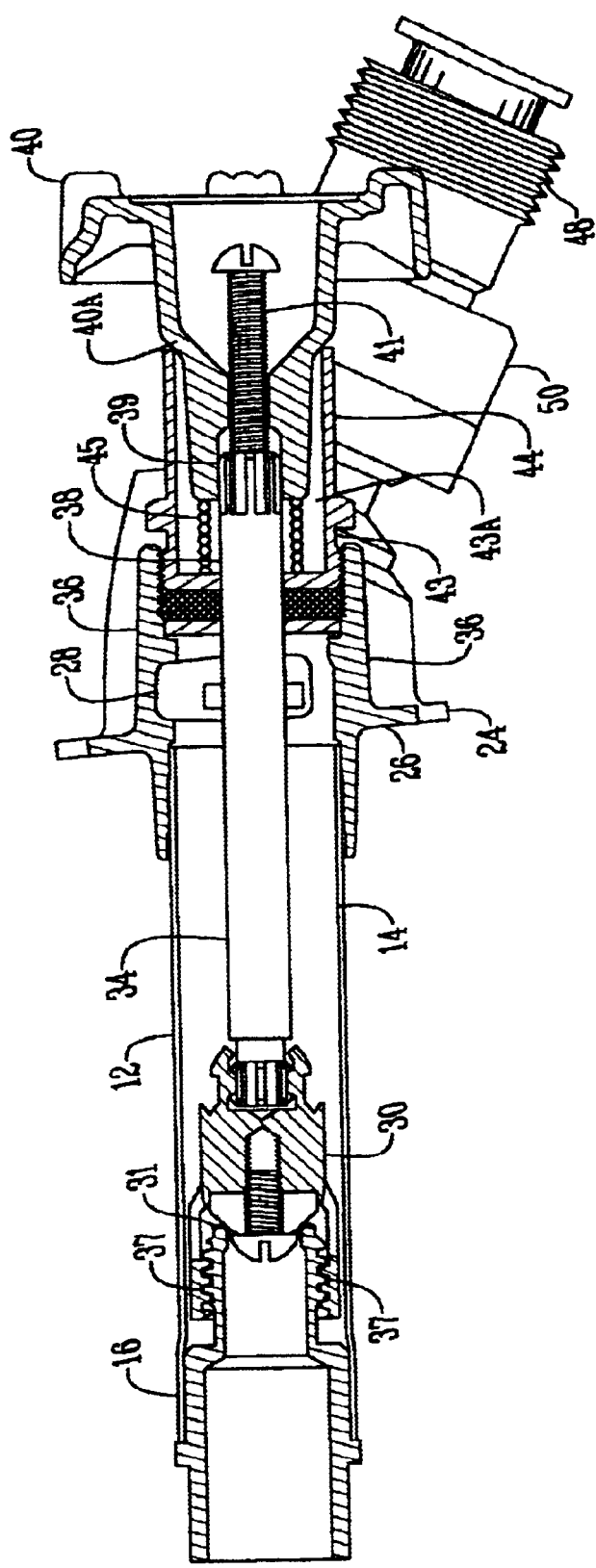
FIG. 4 is a sectional view similar to FIG. 3 but which shows the valve in a closed position and the handle engages the rod.
Figure 5:
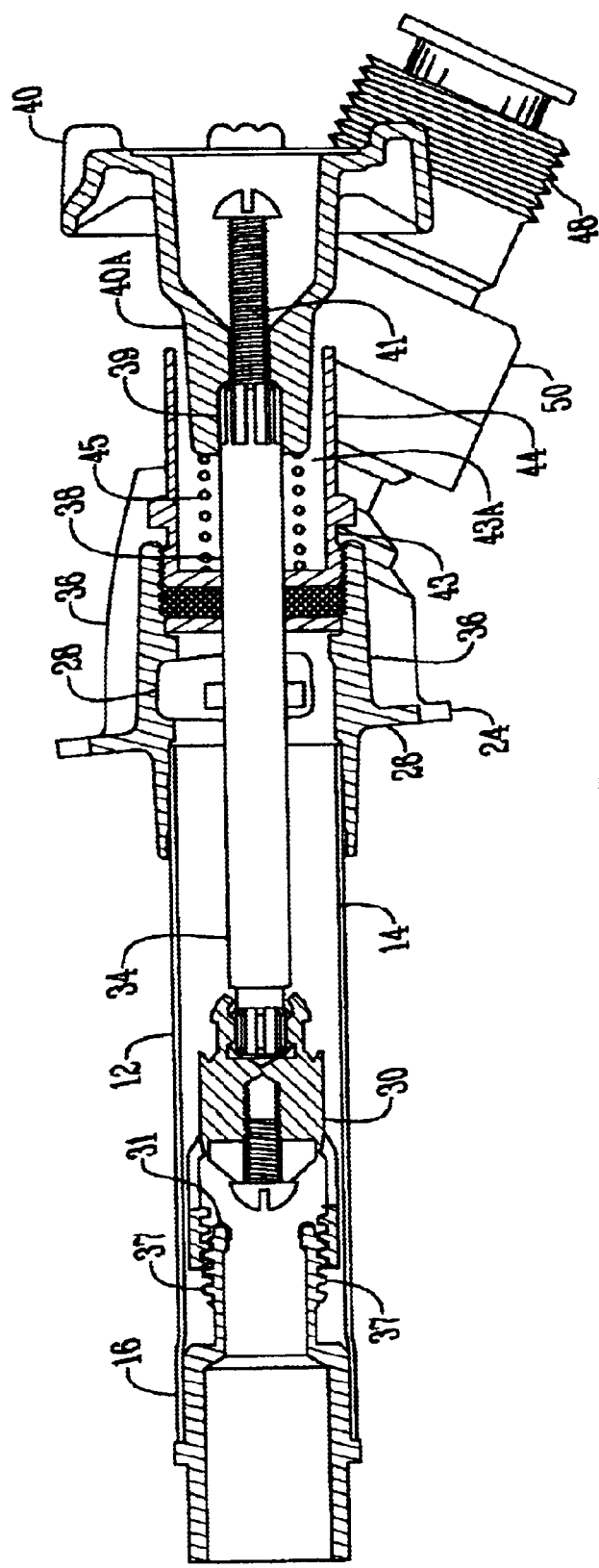
FIG. 5 is a sectional view similar to that of FIG. 4 but shows that the valve is open and the handle engages the rod.
Figure 6:
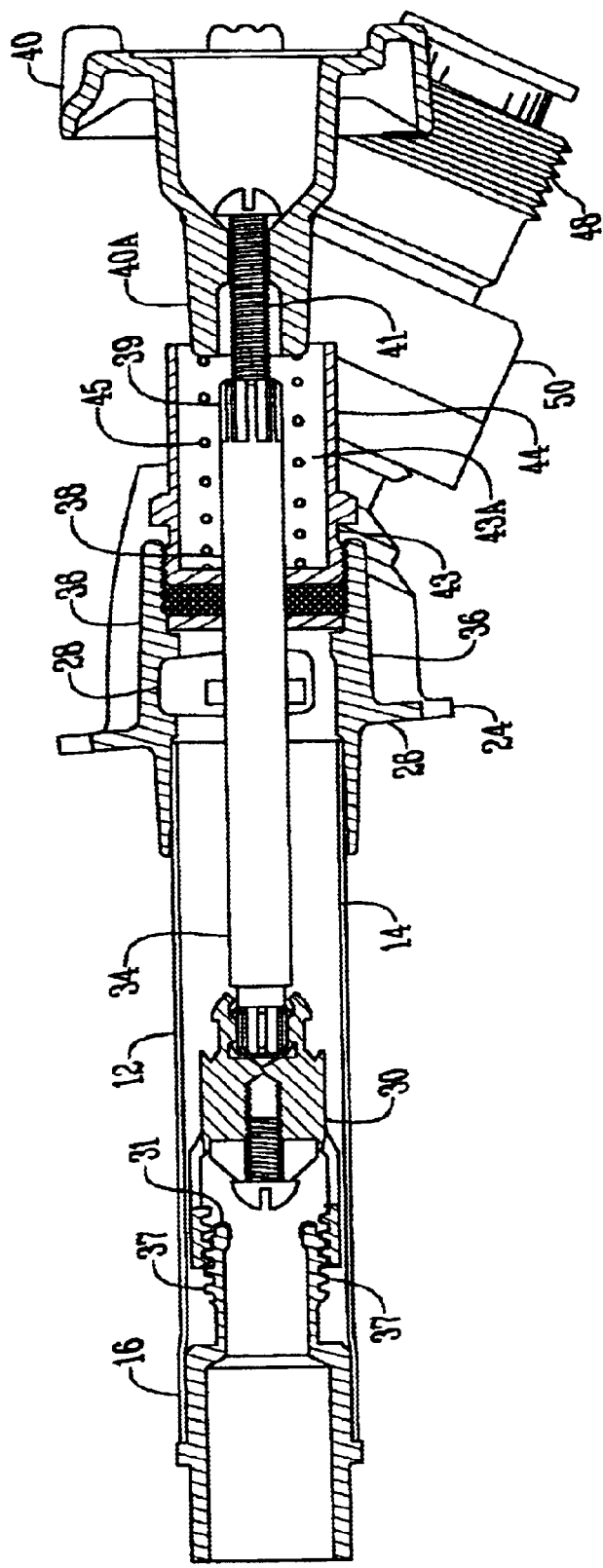
FIG. 6 is a sectional view like that of FIG. 5 but shows that the valve is open and the handle is disengaged from the rod.
Figure 7:
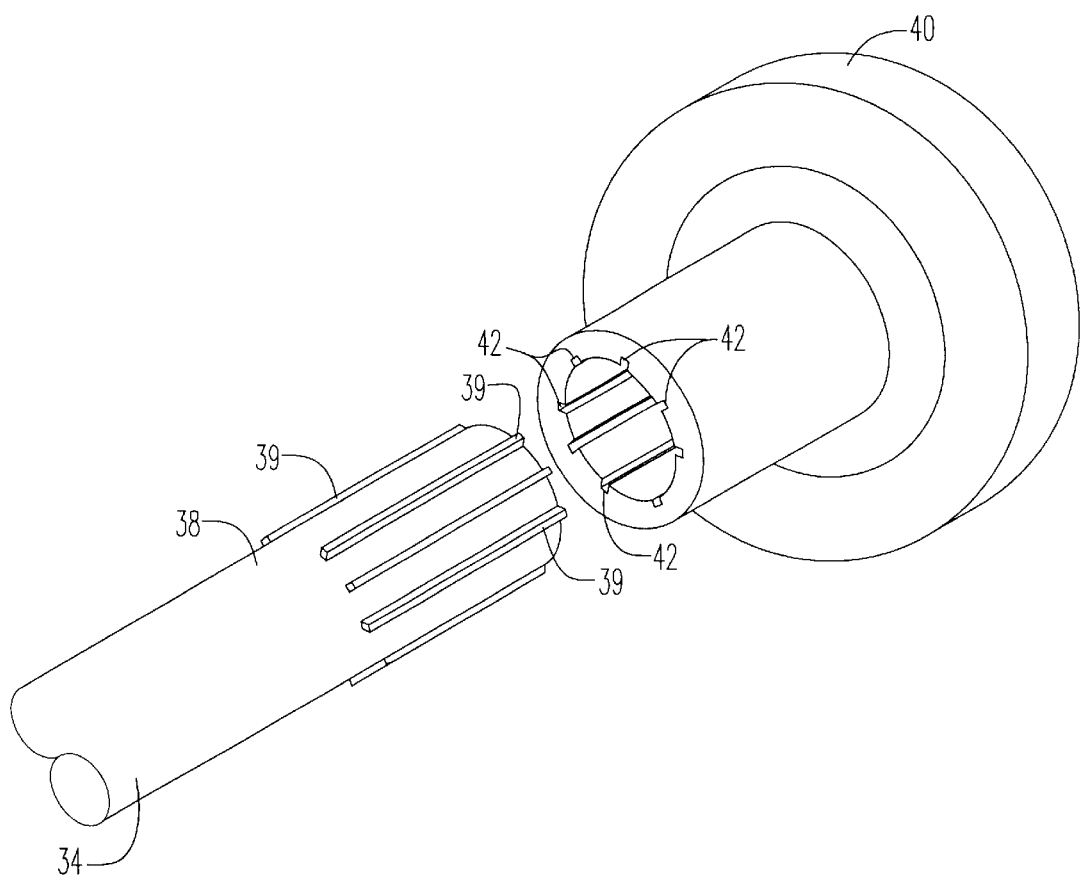
FIG. 7 is a partial exploded perspective view of the handle and the rod.

With reference to FIGS. 1 and 2, the hydrant 10 has a hot water inlet pipe 12 with a forward end 14 and a rearward end 16. A cold water pipe 18 has a forward end 20 and rearward end 22 and is disposed in parallel spaced relationship to pipe 12. The pipes 12 and 18 are connected to sources of hot and cold water 23, respectively.

The internal valving within pipes 12 and 18 as described hereafter can be the same or different. The structure described hereafter is intended to describe the hot water pipe and related components. The cold water pipe can have either the same or conventional internal components.

A mounting casting 24 has a pair of spaced apertures 26 therein and a laterally extending fluid conduit 28. The apertures 26 receive the forward end 14 of pipe 12 and the forward end 20 of pipe 18 and are in sealed connection with the outside surfaces of the respective pipes. The laterally extending fluid conduit 28 is in fluid communication with the interiors of both of the pipes 12 and 18. Fluid closure valves 30 are located in the rearward ends of each of the pipes 12 and 18, and each valve includes a conventional valve seat 31.

An elongated valve rod 34 extends through the apertures 26 in mounting casting 24 and thence extends into each of the pipes 12 and 18. The rods 34 also slidably extend through the packing assemblies 36 which are mounted in the apertures 26 of mounting casting 24 to seal the apertures 26 against fluid flow. The valve rod 34 is longitudinally movable in the pipes 12 and 18 by means of the conventional threaded assembly generally shown by the numeral 37 in FIG. 2. The numeral 38 designates the protruding forward ends of rods 34 which have a plurality of male splines 39.

A conventional handle wheel 40 is mounted on the forward end 38 of rod 34 by screw 41 which threadably extends through shoulder 40A and is longitudinally movable along a conventional screw 41. The shoulder 40A has a plurality of female splines or grooves 42 that slideably engage the male splines 39 of rod 34. Threadably mounted to the packing assembly 36 is a hollow fitting or packing nut 43 with center bore 43A with a stem guard 44 that extends beyond the forward end 38 of the rod. Retained within the center bore 43A of packing nut 43 is a compression spring 45 that is compressed between the packing nut 43 and the shoulder 40A of handle wheel 40. The shoulder 40A is slidable within the center bore 43A.

A fluid output port 46 extends downwardly and forwardly from the mounting casting 24 and is in fluid communication with the laterally extending fluid conduit 28 within casting 24. The port 46 terminates in a conventional hose-threaded nozzle end 48. A conventional check valve 50 is located within fluid output port 46 to permit fluid flow in the conduit only in a direction towards the nozzle end 48. Thus, a continuous fluid chamber exists in the hydrant 10 and extends from each of the valves 30 forwardly through the pipes 12 and 18, and thence across the laterally extending fluid conduit 28, and thence through the fluid output port 46. Because the port 46 extends forwardly and downwardly from casting 24, any residual fluid in the above described fluid department will move by gravity and will exit through nozzle end 48 of the port 46.

In operation, both of the fluid closure valves 30 are normally closed to prevent flow of any incoming fluid, hot or cold, through the inlet pipes 12 and 18. When hot water is needed at the nozzle end 48, the wheel handle 40 is manually pushed toward the valve rod 34 where spring 45 is compressed and the female splines 42 slideably engage the male splines 39 of rod 34. Then, the wheel handle 40 is rotated in a counter clockwise direction to cause the rod 34, through the threaded assembly 37 to cause the fluid closure valve 30 to remove itself from valve seat 31, thus permitting hot water to flow into the inlet pipe 12. The hot water flows thence through the laterally extending fluid conduit 28 and thence outwardly through fluid outlet port 46 and nozzle end 48. When manual pressure is removed from the wheel handle 40, force from the spring 45 disengages the female splines 42 from the male splines 39. When hot water is not needed, the process is repeated except the wheel handle 40 is rotated in a clockwise direction.

The same phenomenon described above would also exist in reverse form when the closure valve 30 in pipe 18 is opened and the closure valve 30 in pipe 12 is closed.

It is also possible to have both closure valves 30 in both inlet pipes 12 and 18 open at the same time to blend hot and cold water within the composite fluid compartment downstream from each of the valves 30.

Conventionally, no water exterior of nozzle end 48 is permitted to enter the hydrant 10 by reason of the conventional check valve 50. Residual water in any of the conduits will flow by gravity out of nozzle end 48 of port 46.

By releasing screw 41, the wheel handle 40 can be removed. In this disassembled state, the stem guard 44 prevents one from using conventional tools such as pliers or a wrench from turning the faucet on or off.

Therefore it is seen that this invention achieves all of its stated objectives.

What is claimed is:

1. A hydrant for delivery of water from a hot and a cold pressurized source, comprising, a fluid inlet pipe having forward and rearward ends, a fluid closure valve in the rearward end of the inlet pipe, a fluid outlet port connected to the forward end of the inlet pipe, an elongated valve rod extending through the pipe and having a rearward end connected to the fluid closure valve, and a forward end terminating in a plurality of splines, a hollow fitting secured to the forward end of the inlet pipe and receiving the forward end of the rod, a rod operating-handle in an outward end of the fitting and having a shoulder longitudinally slideably mounted in the fitting, a plurality of spline grooves in the shoulder adapted to slideably receive the splines on the forward end of the rod in a first position of longitudinal movement, and being adapted to disengage connection with the splines on the forward end of the rod in a second position of movement in an opposite direction, and a spring between the shoulder and the fitting to normally hold the spline grooves in a condition of disengagement, but to permit the splines and the spline grooves to be operatively engaged when the operating handle and the shoulder are slideably moved to the first position to compress the spring, whereupon rotatable movement of the operating handle in the first position will rotate the rod to open the closure valve.

2. The device of claim 1 wherein the fluid pipe delivers water from only the hot source.

3. The device of claim 1 wherein the hydrant delivers water from both the hot and the cold sources.

4. The device of claim 1 wherein the hollow fitting includes a stem guard which extends beyond the forward end of the rod.

5. The device of claim 4 where the stem guard comprises a circular hollow forward end of the fitting which closely surrounds the splines on the forward end of the rod and extends forwardly beyond the forward end of the rod when the closure valve is closed to inhibit the use of a separate tool to rotate the rod.

\* \* \* \* \*